(No Model.)

A. H. OVERMAN.
WHEEL.

No. 438,383.　　　　　　　　Patented Oct. 14, 1890.

Witnesses:
Chas B. Shumway
Soloman Zunder

Inventor:
Albert H. Overman
By Earle Seymour
Attys.

UNITED STATES PATENT OFFICE.

ALBERT H. OVERMAN, OF SPRINGFIELD, MASSACHUSETTS, ASSIGNOR TO THE OVERMAN WHEEL COMPANY, OF HARTFORD, CONNECTICUT.

WHEEL.

SPECIFICATION forming part of Letters Patent No. 438,383, dated October 14, 1890.

Application filed July 16, 1890. Serial No. 358,979. (No model.)

*To all whom it may concern:*

Be it known that I, ALBERT H. OVERMAN, of Springfield, in the county of Hampden and State of Massachusetts, have invented a new Improvement in Vehicle-Wheel Rims and Tires; and I do hereby declare the following, when taken in connection with accompanying drawings and the letters of reference marked thereon, to be a full, clear, and exact description of the same, and which said drawings constitute part of this specification, and represent, in—

Figure 1:
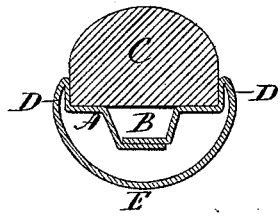
Figure 2:
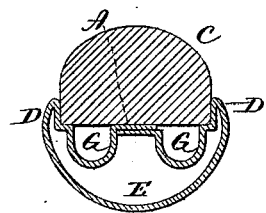
Figure 3:
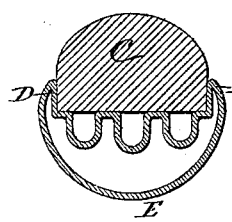
Figure 4:
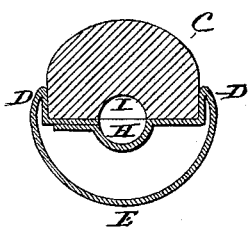

Figure 1, a view in transverse section of a wheel-rim embodying my invention; Figs. 2, 3, and 4, similar views of three modified forms which it may assume.

My invention relates to an improvement in vehicle-wheel rims, the object being to provide for wider range in the cushioning action of the tire than has been possible as the rims have been ordinarily constructed heretofore.

With this end in view my invention consists in a wheel-rim having a flat tread provided with one or more depressions to receive portions of the flat base of the tire when the same is under pressure.

As shown in Fig. 1 of the drawings, the flat tread A of the rim is centrally depressed to form an open space B below the center of the flat base of the tire C, the edges whereof are supported upon the flat edges of the tread, which is situated below and between two retaining-flanges D D, forming narrow extensions of the body E of the rim. The flat tread of the rim shown by Fig. 2 of the drawings has two parallel depressions formed in it, and that shown by Fig. 3 of the drawings three corresponding depressions G. The elevated portions of the treads, as shown in these figures, support the tire and give it stability, while allowing it to sink down into the depressions between them under pressure.

If desired, instead of making the depressions deep, as shown, they may be made shallower, and a portion of the required free space secured by forming one or more depressions or cavities in the flat base of the tire. An example of such a construction is to be found in Fig. 4 of the drawings, in which the tread of the rim has a shallow depression H formed in it and the flat base of the tire a corresponding depression I, co-operating with the said depression in the tread to form a free space for the inner portions of the tire to expand into when its outer portions are under pressure. It is therefore apparent that I am not limited to the particular form either of rim or tire herein shown and described, and I would have it understood that I hold myself at liberty to make such variation therefrom as fairly falls within the spirit and scope of my invention.

Having fully described my invention, what I claim as new, and desire to secure by Letters Patent, is—

1. The combination, with a rubber tire having a flat base, of a wheel-rim having a flat tread provided with one or more depressions for the tire to expand into, substantially as described.

2. The combination, with a rubber tire having a flat base, of a wheel-rim having a flat tread provided with a central depression to form a free space for the tire to expand into, substantially as described.

3. The combination, with a rubber tire having a flat base with a depression formed therein, of a wheel-rim having a flat tread provided with a depression which, with that in the tire, combines to form a free space for the tire to expand into, substantially as described.

ALBERT H. OVERMAN.

Witnesses:
B. C. BREWSTER,
E. BARRY.